United States Patent [19]

Ellis

[11] Patent Number: 4,570,299
[45] Date of Patent: Feb. 18, 1986

[54] OVA COLLECTING APPARATUS AND METHOD

[76] Inventor: Freddie T. Ellis, 100 Hickory St., Metter, Ga. 30439

[21] Appl. No.: 503,091

[22] Filed: Jun. 10, 1983

[51] Int. Cl.⁴ ............................................. A22C 21/00
[52] U.S. Cl. .......................................... 17/45; 17/11; 209/702; 209/942
[58] Field of Search ............... 17/24, 11, 45; 209/942, 209/912, 702, 705

[56] References Cited

U.S. PATENT DOCUMENTS

| | | | |
|---|---|---|---|
| 1,316,626 | 9/1919 | Lundell | 17/24 |
| 2,381,044 | 8/1945 | Franz | 17/45 |
| 2,516,499 | 7/1950 | 17 | 11 X/ |
| 2,738,547 | 3/1956 | Zebarth | 17/11 |
| 3,480,140 | 11/1969 | Unkefer | 209/73 |
| 3,659,710 | 5/1972 | Tice | 209/125 |
| 3,930,994 | 1/1976 | Conway | 209/74 M |
| 4,090,275 | 5/1978 | Jorgensen et al. | 17/24 |
| 4,372,099 | 2/1983 | Linville | 17/11 X |

*Primary Examiner*—Willie G. Abercrombie
*Attorney, Agent, or Firm*—Jones & Askew

[57] ABSTRACT

A method and apparatus for collecting ova removed from fowl moving along a poultry processing line. Ova are removed from the fowl shortly before inspection, and the removed ova are transferred to a separate ova conveyor. One or more ova-ejection stations are located along the ova conveyor, which operates at a speed correlated to the speed of the bird conveyor line. If a defective fowl is detected by inspection after removal of ova, ova are ejected from a corresponding location along the ova conveyor, thereby ejecting any ova removed from the defective fowl. Ova reaching the end of the conveyor are collected for use.

10 Claims, 3 Drawing Figures

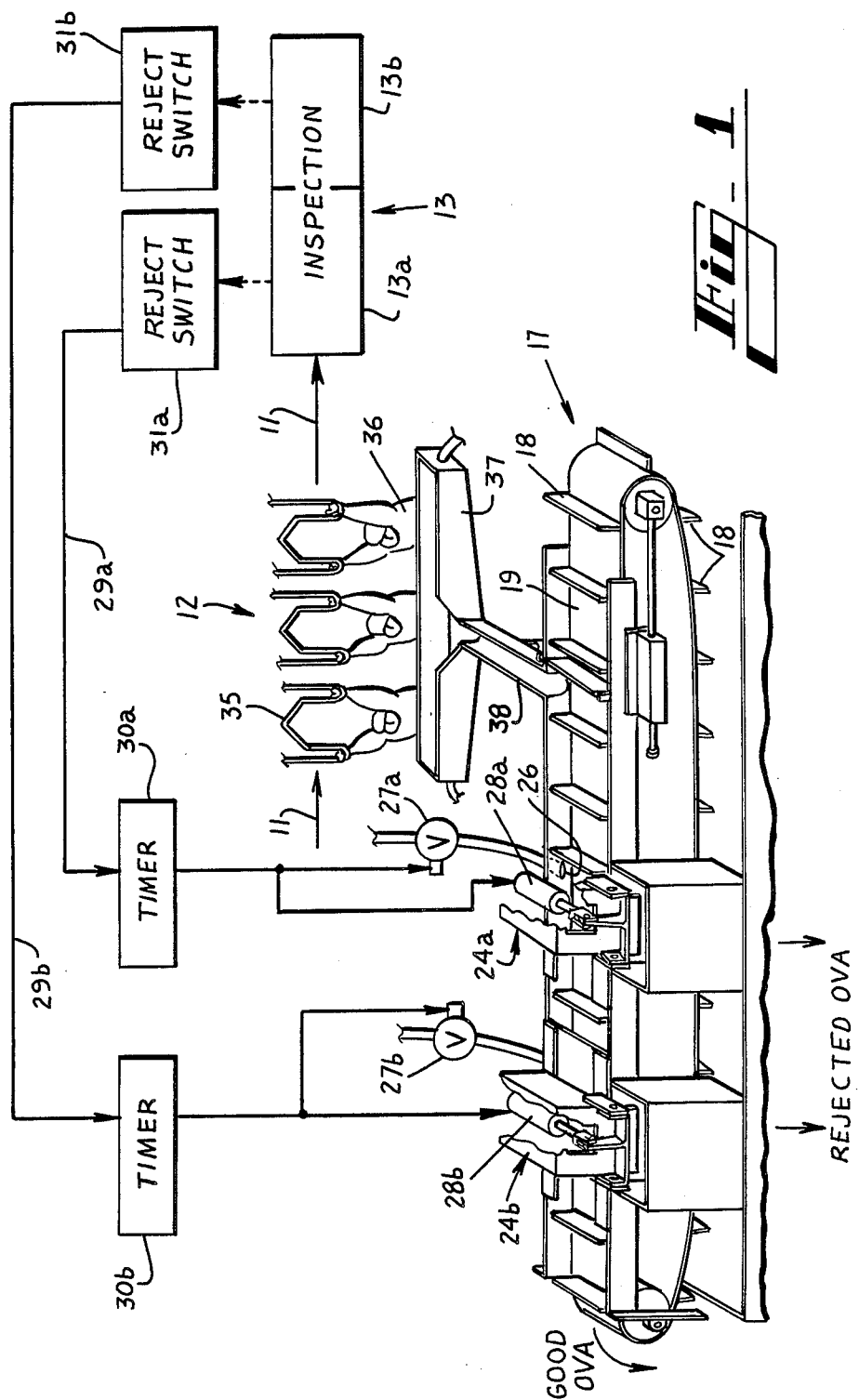

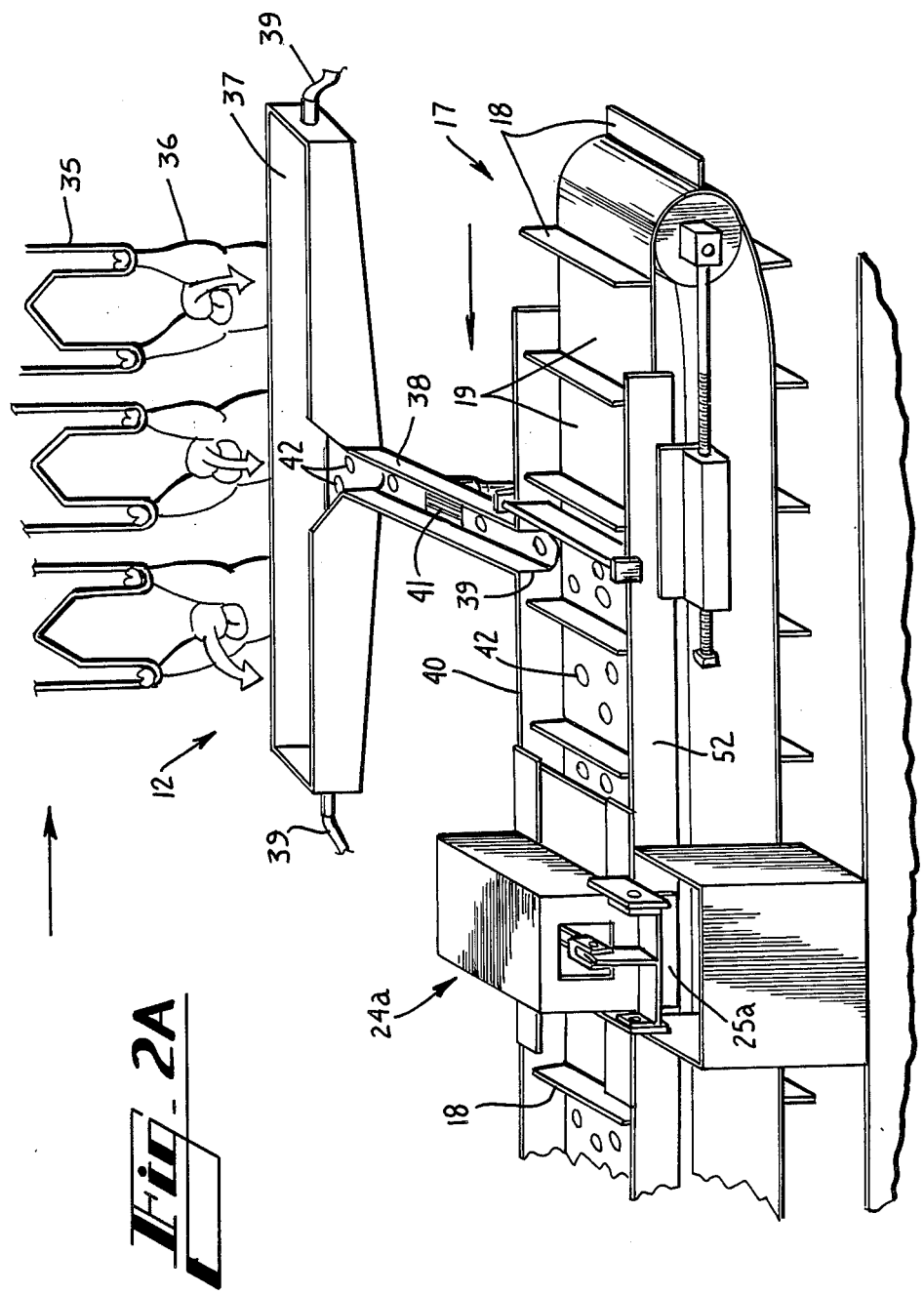

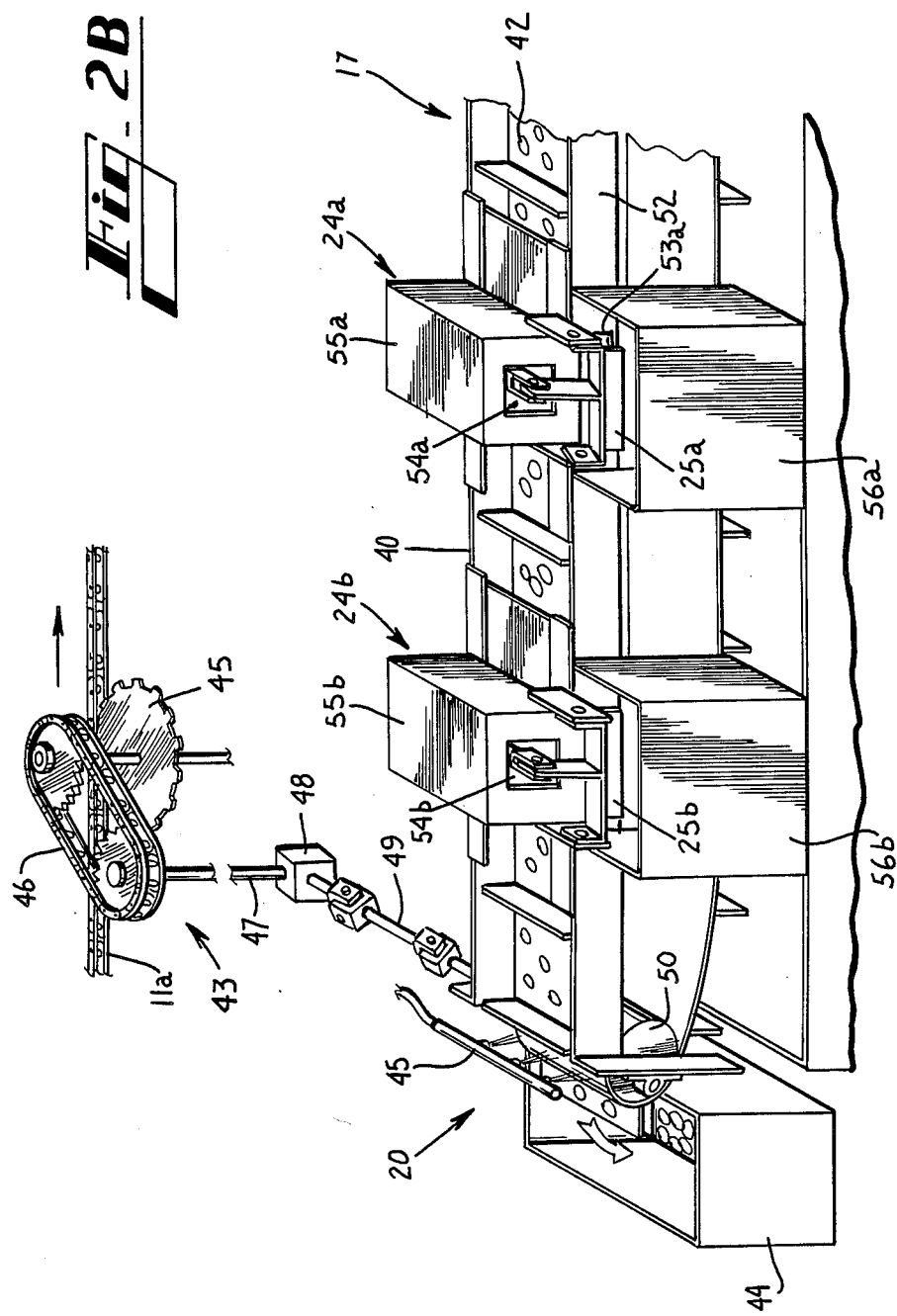

OVA COLLECTING APPARATUS AND METHOD

FIELD OF THE INVENTION

This invention relates in general to poultry processing, and in particular relates to apparatus and method for collecting ova removed from freshly-killed fowl in a poultry processing facility.

BACKGROUND OF THE INVENTION

Processing freshly-killed poultry has become an increasingly mechanized operation. Chicken or other fowl are placed on shackles moved by an overhead conveyor in the typical modern poultry processing plant, and the freshly-killed fowl thus are conveyed through various processing stages in the plant. Poultry processing equipment and techniques generally are well-known to those skilled in the art.

During a typical poultry processing operation, the fresh ova are harvested or removed from the fowl and separately processed or packaged for sale to large-scale users of egg yolks. Removal of ova from the fowl generally takes place on the processing line before the fowl are inspected for indications of disease or other irregularities not meeting prevailing health standards. If a fowl fails the health inspection, the ova previously removed from that fowl likewise are suspect, and cannot be used for human consumption. In order to be able to discard the ova earlier removed from a rejected fowl, it thus becomes necessary to be able to identify with some accuracy the ova removed from each particular fowl, so as to avoid the need for discarding a large number of ova.

One known technique for associating ova with a particular fowl employs a separate ova-collecting cup fastened to each individual bird-holding shackle on the conveyor line. The ova are manually removed from each fowl, and that operator must place the ova from each fowl into the shackle-mounted cup carrying that fowl. If a particular fowl thereafter fails inspection on the processing line, the ova-collecting cup on that shackle is manually dumped to discard the ova previously removed from the rejected fowl. All the cups are automatically dumped at a subsequent point on the conveyor line, for collecting the ova removed from fowl that passed inspection. Because these cups are of necessity relatively small, and because ova are naturally slippery and difficult to grasp, the ova frequently are dropped or otherwise mishandled and thus are wasted. Furthermore, the conveyor lines in poultry processing plants of any size have a large number of bird-holding shackles, requiring a corresponding investment in providing and maintaining the ova collecting cups associated with these shackles. Moreover, these cups must be periodically cleaned, along with the rest of the bird-handling equipment, requiring an additional expense to the processing plant operator.

Another known technique for collecting ova calls for separating the ova into substantial batches, e.g., forty or so ova, and placing the batch into a separate collecting tube. The fowl providing ova for each collecting tube also are identified by batch. If a single fowl in a batch subsequently fails to pass the health inspection, all ova in that batch must then be discarded. The waste inherent in this prior-art technique is apparent.

SUMMARY OF THE INVENTION

The present invention does away with the need for individual ova cups or other receptacles on each bird-holding shackle, and yet temporarily maintains sufficient identity between the fowl and the ova removed from the fowl.

Ova removed from the fowl are placed on a second path moving at a speed correlated to the movement of fowl along the main conveyor line. If a particular fowl fails to pass inspection at a subsequent location on the main conveyor line, ova are ejected from a portion of the second path corresponding to the location on that path where ova from the rejected bird were introduced. The remaining ova continue along the second path for collection.

Stated somewhat more specifically, the ova removed from the fowl go to a separate ova-receiving conveyor leading to a collection location for ova from acceptable fowl. The speed of this ova conveyor is correlated with the speed of the bird-handling conveyor, so that the ova conveyor travels a certain distance in the time required for each fowl to travel from the ova removal location to the inspection location. The ova removed from a particular fowl thus arrive at a certain location on the ova conveyor as that fowl arrives at the inspection location. If a fowl fails inspection, the inspector operates an ova rejection control causing ova to be ejected from the corresponding certain location on the ova conveyor.

Stated with further particularity, the ova conveyor is divided into a number of compartments for receiving ova removed from the fowl. Each compartment typically may receive several ova, and the ova from adjacent birds may become commingled while moving to the ova conveyor. When a rejectable fowl subsequently is detected, all ova are ejected from one or more contiguous compartments on the ova conveyor, insuring that no ova from the rejected bird remains on the ova conveyor. Although some ova removed from good fowl may be rejected by the present invention, this number is relatively small and in any case considerably less than the number of ova inadvertently lost or intentionally wasted in the practice of prior-art ova collecting techniques.

Accordingly, it is an object of the present invention to provide improved method and apparatus for collecting ova.

It is another object of the present invention to provide an ova collecting method and apparatus providing more efficient collection of ova from fowl.

It is still another object of the present invention to provide an improved method and apparatus for collecting ova from fowl and rejecting those ova from fowl subsequently found to be defective.

Other objects and advantages of the present invention will become more readily apparent from the following description of a preferred embodiment.

BRIEF DESCRIPTION OF DRAWING

FIG. 1 is a semi-schematic view of an ova collecting method and apparatus according to a preferred embodiment of the present invention.

FIGS. 2A and 2B are relatively enlarged views showing the disclosed embodiment in somewhat greater detail, with some overlap between the two figures and with one ova rejecting gate shown opened in FIG. 2B.

DETAILED DESCRIPTION OF PREFERRED EMBODIMENT

Turning first to FIG. 1, there is shown at 10 an embodiment of ova collecting apparatus constructed and functioning according to the present invention. Fowl 36 travel to the ova collecting apparatus 10 along a conveyor line 11, which may be an overhead conveyor chain from which shackles 35 are suspended in the conventional manner. The fowl 36 pass by an ova removal location 12 where ova are manually removed from the fowl. The fowl, with ova removed, then continue along the conveyor line 11 to an inspection location 13 where the fowl, principally the viscera which has been partially removed from the fowl, are inspected for possible disease or other defects. Fowl found to be defective are subsequently removed from the conveyor line 11 for suitable disposition.

The ova removed from the fowl serially arriving at the ova removal location 12 are transferred as described below to the ova conveyor 17. This ova conveyor in the disclosed embodiment is a belt conveyor equipped at periodic intervals with a number of partitions 18 spaced apart to define ova receiving compartments 19 along the conveyor belt. The ova removed from the fowl on the conveyor line 11 thus serially enter the compartments 19 of the ova conveyor 17, and there are conveyed toward the exit end 20 of the ova conveyor for collection as "good ova".

Disposed adjacent the ova conveyor 17 preceding the collection end 20 are a pair of separate ejection mechanisms 24a and 24b. Each ejection mechanism includes a gate 25a, 25b (FIG. 2B) located along one side of the ova conveyor and extending approximately the distance between two adjacent conveyor partitions 18, and further includes one or more water inlet openings 26 (FIG. 1) in the fixed wall at the opposite side of the conveyor from the gate. The water openings 26 are connected to a suitable water supply through normally-closed solenoid valves 27a, 27b. The gates 25a, 25b are mechanically linked to the gate-operating solenoids 28a, 28b, so that each gate moves away from a corresponding opening in the fixed wall at the front side of the ova conveyor 17, exposing the adjacent conveyor compartment 19 when the respective gate solenoid is actuated. Both the gate solenoid 28a and the solenoid valve 27a are connected in parallel to the operating signal line 29a, which is energized for a predetermined time by the timer 30a in response to a momentary input signal from the reject switch 31a located at the inspection location 13.

The gate solenoid 28b and solenoid valve 27b are similarly connected for operation by the timer 30b in response to the reject switch 31b at the inspection location. Each ejection mechanism 24a and 24b thus is separately operable, as explained below. It will also be seen that the present invention can be practiced with apparatus having only a single ejection mechanism and corresponding operating controls, or with more than the two such mechanisms shown in the disclosed embodiment of the invention.

Turning now to FIGS. 2A and 2B, the ova collection location and ova conveyor of the disclosed embodiment are shown in greater detail. Considering first the ova removal location 12, a number of bird-holding shackles 35 are shown suspended from a fragmentary portion of the conveyor chain 11a making up the conveyor line 11. Suspended from each shackle 35 is a fowl 36, moving directly in front of an open-top ova collecting trough 37 forming part of the disclosed embodiment. The trough 37 preferably is sufficiently long so that several fowl 36 in contiguous shackles can simultaneously pass along the trough. The ends of the trough are sloped slightly downwardly toward the center of the trough, there joining the ova-conducting chute 38. Water inlet lines 39 are connected to each end of the trough 37, introducing water streams flowing to the midpoint of the trough and then downwardly along the chute 38.

The trough 37 is elevated somewhat above the ova conveyor 17, and the chute 38 slopes downwardly to terminate at an open lower end 39 extending through the fixed side wall 40 along the back side of the moving ova conveyor. The chute 38 thus provides a gentle gravity fall of ova from the trough 37 into the ova conveyor. The bottom of the chute 38 preferably is solid except for a grate portion 41 located upstream from the lower end 39 of the chute.

Considering the operation of the apparatus thus far shown in FIG. 2A, one or more operators standing in front of the trough 37 manually remove ova from the fowl 36 passing along the trough. These removed ova flow by gravity toward the inlet of the chute 38 at the center of the trough 37, this movement being assisted by the flow of water introduced at the ends of the trough. It will thus be understood that ova from several fowl 36 may more or less concurrently enter the trough 37 and become commingled as these ova travel down the chute 38 to enter the ova conveyor 17. The grate 41 in the chute 38 allows water to exit the chute before reaching the ova conveyor. The ova 42 removed from the birds 36 moving past the trough 37 thus enter the ova conveyor compartments 19 serially moving past the outlet 39 of the ova chute.

FIG. 2A shows that the ova receiving compartments 19 of the ova conveyor 17 are large enough to receive a number of ova. These compartments move along the conveyor to pass beneath the ova ejection mechanism 24a, which is the first such mechanism as becomes apparent from FIGS. 1 and 2B. The second ejection mechanism 24b is located a certain distance downstream from the first ejection mechanism 24a along the ova conveyor, but otherwise functions in a manner similar to the first ejection mechanism. The reason for two such ejection mechanisms is explained below.

Ova remaining on the conveyor 17 at the collection end 20 are deposited in a suitable receptacle 44. A water spray bar 45 located above the end of the ova conveyor helps remove the ova from the conveyor and provides a protective stream of water to flow the ova into the container 44.

It is important that movement of the ova conveyor 17 be correlated with movement of the bird conveyor line 11. This correlation is simply accomplished by a direct mechanical interconnection 43 between the bird conveyor chain 11a and the ova conveyor, as shown in FIG. 2B. This mechanical interconnection 43 in the disclosed embodiment includes a sprocket 45 positioned to be driven by the bird conveyor chain 11a, a short drive chain 46 driven by the shaft attached to the sprocket 45 and connected to the downwardly-extending shaft 47, the right-angle drive 48 coupled to the shaft 47, and the universal-jointed drive shaft 49 extending to the roll 50 at the collection end 20 of the ova conveyor. It will thus be seen that the ova conveyor 17 operates at a speed directly correlated with the speed of the conveyor chain 11a, although it should be understood that the ova conveyor need not necessarily operate at the same lineal speed as the conveyor chain 11a.

Because the operating speeds of the ova conveyor 17 and the bird conveyor chain 11a are interrelated, it will now be seen that the first ejection mechanism 24a is located at a point along the ova conveyor reached by ova removed from fowl at the ova removal location 12, at the time those same fowl later arrive at an initial portion 13a of the inspection location 13. The placement of the ejection mechanism 24a along the ova conveyor 17 thus is affected by several variables, including the distance between the ova removal location 12 and the portion 13a of the inspection location 13, the time required for freshly-removed ova to travel from the trough 37 downwardly onto the ova conveyor, and the overall drive ratio between the conveyor chain 11a and the ova conveyor.

Many poultry processing plants employ more than one inspector at the inspection location. With two inspectors, each typically will inspect every other bird traveling along the conveyor line. For a two-inspector inspection location 13, the two corresponding ejection mechanisms 24a and 24b (FIG. 2B) are provided along the ova conveyor 17. The separate ejection mechanisms may be identical, and each ejection mechanism is separately controlled by a timer and inspector-operated reject switch shown in FIG. 1. The two inspectors are slightly spaced apart from each other at the initial portion 13a and a subsequent portion 13b of the inspection location 13, and separate reject switches are available to the inspectors at the respective inspection portions 13a and 13b.

It will be appreciated that the second ejection mechanism 24b is spaced downline along the ova conveyor 17 from the first ejection mechanism 24a by a distance equivalent to the travel time between the two inspectors at 13a and 13b, along the bird conveyor line 11. Each ejection mechanism 24a, 24b includes a separate gate 25a, 25b, normally closing an opening in the near side wall 52 of the ova conveyor 17. One such side wall opening 53a is shown in FIG. 2B, where the gate 25a is shown opened. Each gate 25a, 25b is pivotably mounted and connected by linkage 54a, 54b to a corresponding gate solenoid within the enclosure 55a, 55b. The respective gates 25a, 25b thus pivot forwardly and away from the conveyor side wall 52 to expose the corresponding side wall opening when the corresponding gate solenoid is actuated in response to one of the ejection switches.

It should be understood that the illustration of two ejection mechanisms 24a and 24b is only by way of example, determined by a corresponding number of inspectors at a particular inspection location. An inspection location having but a single inspector would require only a single ejection mechanism 24, and processing lines with more than two inspectors and a corresponding number of ejection mechanisms are within the scope of the present invention.

Turning now to the operation of the embodiment with particular reference to FIGS. 2A and 2B, it will be understood that one or more persons at the ova removal location 12 manually remove ova 42 from the fowl 36 passing that location. These ova 42 are placed in the trough 37, and immediately move down the chute 38 to enter the ova conveyor compartments 19 moving past the lower end 39 of the chute. In case no fowl is subsequently rejected at the inspection location 13, the ova 42 are conveyed past the ejection mechanisms 24a and 24b and are collected in the receptacle 44 for subsequent use.

When a defective fowl is detected at the inspection location, that inspector manually actuates the reject switch 31a or 31b at the inspection station. Assuming this inspection station is the first or initial such station at 31a encountered by fowl arriving at the inspection location 13, the corresponding ejection mechanism 24a thus is actuated, opening the gate 25a and operating the solenoid valve 27a associated with that ejection mechanism to introduce a flow of water from the far side wall 40 of the ova conveyor. This flow of water across the ova conveyor flushes all ova 42 on the ova conveyor present beneath the ejection mechanism 24a during the time the ejection mechanism operates, as determined by the timer 30a, the ova being flushed through the open gate 25a and directed downwardly by the chute 56a. The ejected ova may be collected in a container located below the chute 56a, or alternatively may enter a waste drain for disposal.

The second ejection mechanism 24b operates in the same manner as the first such mechanism, differing only in being actuated in response to a second reject switch 31b operated by the inspector at the second or subsequent inspection station 13b at the inspection location 13.

Each ejection mechanism 24a or 24b begins operating immediately when an inspector actuates the corresponding reject switch, and the timer 30a, 30b preferably keeps the ejection mechanism operating long enough to eject ova from more than one successive compartment 19 passing by the open gate 25a, 25b. In a specific embodiment of the present invention, each ejection mechanism is operated by the respective timers to eject ova from two or three successive compartments of the ova conveyor, in response to a momentary operation of the corresponding reject switch. Each ejection mechanism 24a, 24b thus is located along the ova conveyor 17 slightly ahead of the ova removed from a fowl arriving at the corresponding inspection station. In that way, ova ejection starts just before ova from the rejected fowl actually arrive at the ejection mechanism, and the ova ejection is timed to continue until shortly after the actual ova arrive at the ejection location. This described operation ejects ova from a range of locations on the ova conveyor bracketing the particular compartment 19 likely to contain ova from the defective fowl, and thus insures that such ova are ejected and will not reach the collection end 20 of the conveyor. Although this method of operation may eject ova removed from nonrejected fowl, the number of "good" ova thus rejected with the present invention has been found to be less than the loss or wastage of ova with prior art techniques.

Although the ova conveyor 17 in the disclosed embodiment moves in a direction opposite from that of the bird conveyor 11, it should be understood that this is only by way of example. The particular direction of motion of the ova conveyor is only a matter of choice and convenience, and is not critical to the present invention.

It should also be understood that the foregoing relates only to a preferred embodiment of the present invention, and that numerous changes and alterations may be made therein without departing from the spirit and scope of the invention as defined in the following claims.

I claim:

1. The method of collecting ova from the carcasses of fowl serially moving along a first path, comprising the steps of:

removing and commingling the ova from at least two carcasses while at a first location on the first path, thereby losing the identity of the particular carcass from which each ovum is removed;

serially transferring the commingled ova to a progression of defined ova-receiving regions moving on a second path at a speed correlated to the continuing movement of carcasses along the first path, so that regions on said second path contain commingled ova from more than one carcass;

inspecting the carcasses at a subsequent location on the first path after said removal of ova, so as to identify rejectable carcasses;

moving the ova locations and commingled ova therein along said second path so that an ova location with commingled ova, including ova from a particular carcass, arrives at a certain location on the second path in a predetermined relation with the arrival of that particular carcass at said subsequent location for inspection on the first path; and in response to rejection of a carcass at said subsequent location, ejecting all the commingled ova arrived at said certain location on the second path so that the ova previously removed from the rejected carcass are ejected together with other commingled ova present at said certain location, whereby the ova from rejected carcasses are ejected without identifying the ova removed from each individual carcass.

2. The method as in claim 1, wherein:

ova are ejected from a plurality of ova locations at said certain location in response to said rejection, so that ova from the rejected carcass are ejected along with other commingled ova disposed in said plurality of locations.

3. Apparatus for collecting ova removed from carcasses of fowl serially moving along a first path including an ova removal location followed by a fowl inspection location, said apparatus comprising:

collecting means at said ova removal location for receiving and commingling ova removed from a plurality of carcasses moving along the ova removal location;

ova conveying means defining a plurality of discrete ova-receiving regions and operative to move said regions along a second path from an ova entry location to an ova collecting location at a speed correlated with the movement of said carcasses along the first path;

a passageway receiving said commingled ova and conducting the commingled ova seriatim to enter said entry location;

removal means operatively associated with said ova conveying means at an ejection location between said ova entry and ova collection locations; and said removal means being selectively operative in response to rejection of a fowl at said inspection location to remove from said ova conveying means all the commingled ova conveyed to said ejection location, including ova previously removed from said rejected fowl at said removal location on the first path;

whereby the ova from the rejected fowl along with a commingled ova from other fowl are ejected without identifying the one from each individual fowl, before arriving at said ova collecting location.

4. Apparatus as in claim 3, wherein:

said removal means is a first such means at a first ejection location on said ova conveying means; and further comprising a second ova removal means at a second ejection location spaced apart from said first ejection location on said conveying means;

a first ejection control at said inspection location and selectively operative to produce a first ejection signal when a fowl is rejected at an initial portion of the inspection location;

a second ejection control at said inspection location and selectively operative to produce a second ejection signal when a fowl is rejected at a subsequent portion of the inspection location; and separate means operatively interconnecting said first and second ejection controls with said respective first and second ova removal means, so that the commingled ova are removed from a selected first portion of said ova conveying means in response to operation of said first ejection control, and the commingled ova are removed from a selected second portion of said ova conveying means in response to operation of said second ejection means.

5. Apparatus as in claim 4, wherein:

each said means operatively interconnecting said ejection controls with the respective ova removal means comprises timer means operative in response to an ejection signal from the respective ejection control to operate the respective ova removal means for a predetermined period of time, so as to remove the commingled ova present at the corresponding selected ejection location of said ova conveying means during the predetermined period of time.

6. Apparatus as in claim 3, wherein:

said removal means is operative to eject ova from a plurality of said ova receiving regions including the region containing ova removed from said rejected fowl.

7. Apparatus as in claim 3, wherein said removal means comprises:

control means at said inspection location and selectably operative to produce a signal;

timer means responsive to said signal to produce an ejection signal for a predetermined time; and ova ejection means at said ejection location on said ova conveying means and responsive to said ejection signal to remove commingled ova arriving at said ejection location while the ejection signal remains.

8. Apparatus as in claim 3, wherein said removal means comprises:

means selectably operative to direct a fluid stream across said ova conveying means at said ejection location, so as to remove commingled ova from said ejection location.

9. Apparatus as in claim 3, wherein:

said ova conveying means comprises a movable belt, and a number of upstanding elements at spaced intervals along said belt to define said ova receiving regions;

at least one side wall disposed alongside said belt to retain ova in said regions;

a movable gate in said side wall at said ejection location, said gate selectively operable to open the side wall in response to said rejection of a fowl; and means directing a fluid stream across said ova conveying means toward the opening in said side wall, so as to flush commingled ova from any ova receiving region at said ejection location, in response to said rejection of a fowl.

10. Apparatus as in claim 3, wherein:

said collecting means comprises a trough extending alongside fowl moving past said ova removal location, so as to receive and commingle ova removed from one or more of said fowl; and said passageway comprises a gravity flow path from said trough to a position above the entry location of said ova conveying means;

so that the commingled ova move by gravity from said trough to enter the ova receiving regions serially moving beneath said gravity flow path.

* * * * *